United States Patent [19]

Funatani et al.

[11] 4,000,628
[45] Jan. 4, 1977

[54] DEVICE FOR FIXING A BEARING CUP IN A HOOKE'S TYPE UNIVERSAL JOINT

[75] Inventors: Kiyoshi Funatani, Nagoya; Ryosuke Ozaki; Kazuhiro Mizuno, both of Toyota, all of Japan

[73] Assignee: Toyota Jidosha Kogyo Kabushiki Kaisha, Japan

[22] Filed: Oct. 15, 1974

[21] Appl. No.: 514,908

[30] Foreign Application Priority Data

June 5, 1974 Japan .............................. 49-62811

[52] U.S. Cl. .................................................. 64/17 A
[51] Int. Cl.$^2$ ............................................ F16D 3/26
[58] Field of Search ............. 64/17 R, 17 A, 17 SP, 64/23

[56] References Cited

UNITED STATES PATENTS

| 1,993,357 | 3/1935 | Braun et al. | 64/17 A |
| 3,062,026 | 11/1962 | Pitner | 64/17 A |
| 3,178,907 | 4/1965 | Lyons | 64/17 A |
| 3,369,378 | 2/1968 | Miller, Jr. | 64/17 A |

FOREIGN PATENTS OR APPLICATIONS

| 826,529 | 11/1951 | Germany | 64/17 A |
| 358,633 | 1/1962 | Switzerland | 64/17 A |

*Primary Examiner*—Samuel Scott
*Assistant Examiner*—Randall Heald
*Attorney, Agent, or Firm*—Toren, McGeady and Stanger

[57] ABSTRACT

A bearing cup is fixed in place in a Hooke's type universal joint by a device which features provision of an annular recess in a bearing cup receiving hole which is drilled in one of the yoke members of the universal joint, and a fixing plate which, before assembly, comprises a truncated conical configuration having four radial legs with the plate being plastically deformed under pressure into a flat configuration during assembly and while seated upon an upper surface of the bearing cup in order to secure the radical legs within the annular recess thereby fixing the bearing cup in place.

2 Claims, 6 Drawing Figures

DEVICE FOR FIXING A BEARING CUP IN A HOOKE'S TYPE UNIVERSAL JOINT

BACKGROUND OF THE INVENTION

The present invention relates to universal joints particularly of the Hooke's type adapted for use, for example, in an automobile between a drive shaft and a transmission output shaft or drive pinion shaft of the differential gear unit and, more particularly, the invention is concerned with an improved method and device for fixing a bearing cup in position within a yoke of the universal joint.

Various methods for fixing in place of the bearing cup of a Hooke's type universal joint have been proposed which utilize a resilient fixing member. In each of these methods, the fixing member, when assembled, is elastically deformed under pressure. As a result, the configuration of the fixing member is usually fairly complicated and it has been found that the scope within which the material of the fixing member may be selected is quite limited.

Such methods also have involved difficulty with regard both to the supporting action maintaining the fixing member within the yoke and to maintenance of the member in its plastically deformed state. Furthermore, since the fixing of the bearing cup depends merely upon the resilient action of the fixing member, it becomes quite difficult to fulfill the requirements relating to sufficiency of mechanical strength resisting vibration or impact forces that can be exerted during very short periods of time and during high speed power transmission.

The present invention is aimed at eliminating such defects in prior art devices and at the accomplishment of a secure resilient fixing of the bearing cup in place in a position within the yoke by utilizing resilient deformation of the fixing member with application of pressure while maintaining the plastically deformed fixing member securely in a state of high rigidity.

SUMMARY OF THE INVENTION

Briefly, the present invention may be described as a universal joint assembly comprising, in combination, a pair of pivotally interconnected bifurcated yoke members, joint means including a cruciform spider and needle bearings operatively engaged thereabout interconnecting said yoke members, a bearing cup including a closed end wall enclosing said spider and needle bearings, wall means in one of said yoke members defining a receiving hole therein for enabling insertion into said joint means of said bearing cup, an annular recess formed in said wall means adjacent said closed end wall of said bearing cup, and a fixing plate extending across said closed end wall and engaged within said recess means to hold said bearing cup in place within said assembly.

The invention also involves a method for mounting the fixing member in place which comprises the steps of forming the annular recess within the wall means of the yoke at a location extending thereacross adjacent the closed end wall of the bearing cup, placing against said closed end wall of said bearing cup the resilient fixing plate while in the configuration of a truncated cone, with said truncated conical configuration including a base portion having a diameter which is less than the diameter of the receiving hole, and pressing the fixing member against the closed end wall to deform the fixing member from said conical configuration into a flat planar configuration thereby to cause the base portion of the fixing plate to become engaged within the recess means whereby the bearing cup will be fixed in place within the assembly.

The fixing member may be formed with a plurality of radial legs, preferably four, each of which extend into the recess means.

Each of the radial legs may be formed with an arcuate cross-sectional configuration engaged within the recess means to impart a resilient mounting force between the yoke wall and the bearing cup.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive manner in which there is illustrated and described a preferred embodiment of the invention.

DETAILED DESCRIPTION OF THE PREFERRED EMBODIMENT

Figure 1:
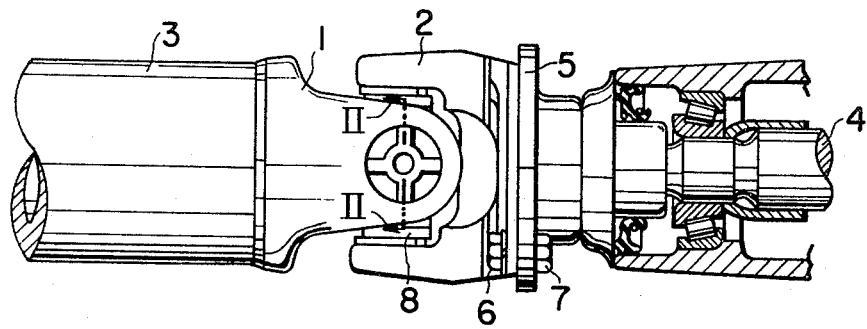
FIG. 1 is a front view of a universal joint assembly of the Hooke's type utilizing the present invention.

Referring now to the drawing, wherein like reference characters refer to similar parts throughout the various figures thereof, there is shown a Hooke's type universal joint which is adapted to be mounted between a drive shaft 3 and a drive pinion shaft 4 which, as shown in FIG. 1, includes two bifurcated yoke members 1 and 2 with the yoke member 1 being welded to the drive shaft 3 while the other yoke member 2 is fastened by a bolt 6 and nut 7 to a companion flange 5 which is splined on the drive pinion shaft 4. The assembly includes a cruciform spider 8 which is disposed between the yokes 1 and 2 and which, as shown in FIG. 2, includes a journal 8a crowned with a bearing cup 10. Needle bearings 9 adapted to minimize the resistance to operation of the assembly are engaged between the journal 8a of the spider 8 and the inner wall of the bearing cup 10. A bearing seal 11 is also provided in order to secure the joint and to ensure a sealed arrangement.

The bearing cup 10 is inserted into the assembly through a corresponding bearing cup receiving hole 12 which is defined within the yoke 1 and which is configured and arranged such that the cup will not be dislodged during rotation.

In accordance with the present invention, an annular recess 13 is provided upon the inner wall of the yoke 1 defining the receiving hole 12 at an appropriate location relative to an upper surface 10a of the bearing cup 10. It will be seen that the bearing cup 10 includes a closed end wall having the surface 10a defined on the outer side thereof and that the recess 13 is located adjacent surface 10a which extends to within the range of the recess 13, as shown in FIG. 2.

Figure 2A:
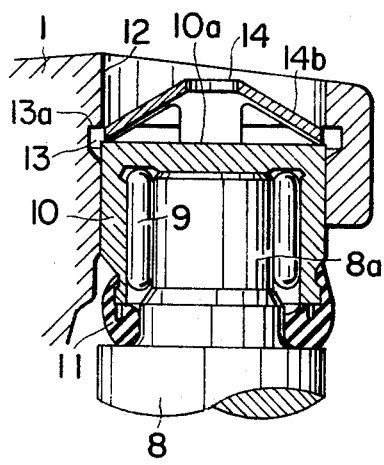
FIGS. 2a and 2b are sectional views taken along the line II—II of FIG. 1 illustrating, respectively, the arrangement of a bearing cup before it is fixed in place and showing the same arrangement of the bearing cup after it has been fixed in place.
Figure 2B:
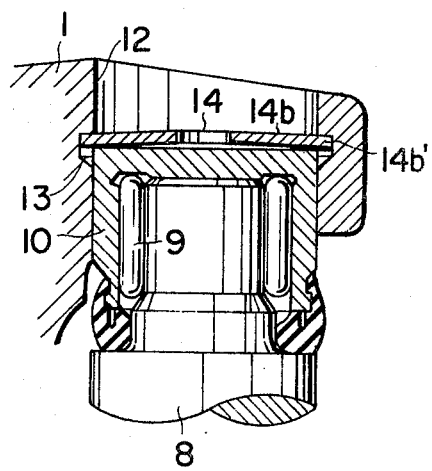
Figure 3A:
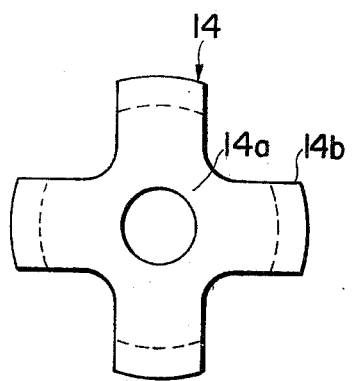
FIGS. 3a, 3b and 3c show a fixing member according to the present invention in plan view, side view and longitudinal sectional view, respectively.
Figure 3B:
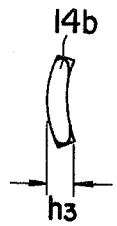
Figure 3C:
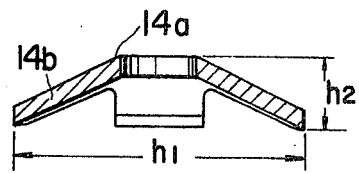

A fixing member or plate 14 adapted to fix the bearing cup 10 in place is arranged to be fitted within the annular recess 13. As shown in FIG. 3, the fixing member 14 comprises a plate-shaped generally thin-walled member which is initially arranged in a truncated conical configuration having a central apex portion 14a and a base portion including four equidistantly spaced radial legs 14b surrounding the central apex portion 14a. Each of the leg portons 14b is shaped with an arcuate sectional configuration. The respective portions of the truncated conical fixing member are dimensioned such that, in its preassembled condition, the member 14 will have an outer diameter $h_1$ of the base portion 14b which is slightly smaller than the inner diameter of the hole 12. The height $h_2$ of the truncated cone is such that when the fixing member is plastically deformed under pressure, its outer diameter will become substantially equal to the inner diameter of the annular recess 13. The height $h_3$ of the arcuate configuration of each of the leg portions 14 is configured to be slightly larger than the space defined between the shoulder 13a of the annular recess 13 and the upper surface 10a of the closed end wall of the bearing cup 10. In the method according to the present invention, the assembly procedures for fixing the bearing cup 10 in place involve placement of the truncated conical fixing member 14 upon the upper side 10a of the closed end wall of the bearing cup 10 such that the fixing member stands upon its legs 14b as shown in FIG. 2a. Subsequently, pressure is applied downwardly at the apex portion 14a of the fixing member 14 by any suitable pressing means such as a press or ram. As a result, the fixing member 14 is plastically deformed from its truncated conical configuration shown in FIG. 2a to a flat planar configuration shown in FIG. 2b. During this plastic deformation, since the ends 14b' of the leg portions do not touch the pressing means, i.e. the press ram, the leg portions will extend outwardly while maintaining the arcuate sectional shape thereof. Each of the legs 14b will become fitted into the annular recess 13 and as a result, the bearing cup 10 will be securely fixed in place within the yoke 1 without any play or spacing between the elements which might give rise to unwanted movement of the cup 10. As a result of the arcuate configuration of the legs 14b of the fixing member 14, a resilient or springlike mounting force will be created between the yoke 1 and the bearing cup 10 which will enhance the resilient and firm securing in place of the cup 10 without play.

The number of legs 14b of the fixing member 14 need not necessarily be four in number, and the width of each leg portion may be suitably selected to be within a range where the desired arcuate sectional configuration can be obtained. Additionally, fitting of the leg ends 14b' into the annular recess 13 will be facilitated by suitably chamferring the parts of the leg ends which touch the upper surface 10a of the closed end wall portion of the bearing cup when moving outwardly.

In accordance with the present invention, since the bearing cup is resiliently fixed in place, no undesirable spacing is created even when the position of the outer surface 10a of the closed end wall of the bearing cup varies due to inaccurate maintenance of machining precision and tolerances. Additionally, the fixing member 14 is securely attached against the outer surface 10a of the bearing cup through its plastic deformation and as a result, assembly is made easy and the completed assembly will exhibit high strength and sufficient rigidity. Since support of the fixing member 14 by the yoke 1 is effected by a tight fit within the annular recess 13, the assembly steps may be accomplished with ease without introducing disadvantages from the point of view of creating excess pre-pressing.

While a specific embodiment of the invention has been shown and described in detail to illustrate the application of the inventive principles, it will be understood that the invention may be embodied otherwise without departing from such principles.

What is claimed is:

1. A universal joint assembly comprising, in combination, a pair of pivotally interconnected bifurcated yoke members, joint means including a cruciform spider and needle bearings operatively engaged thereabout interconnecting said yoke members, a bearing cup including a closed end wall enclosing said spider and needle bearings, wall means in one of said yoke members defining a receiving hole therein for enabling insertion into said joint means of said bearing cup, an annular recess formed in said wall means adjacent said closed end wall of said bearing cup, and a fixing plate extending across said closed end wall and engaged within said recess means to hold said bearing cup in place within said assembly, said fixing plate consisting essentially of a resilient member shaped to enable said member to be deformed with a spring-like snap action between a truncated conical configuration and a flat planar configuration, said fixing plate comprising an inner smaller diameter portion having means defining a central opening extending through said inner smaller diameter portion and a plurality of radial legs extending in a straight linear configuration radially outwardly from said inner smaller diameter portion and including radially outermost ends extending into engagement within said annular recess, each of said radial legs comprising an arcuate cross-sectional configuration to provide a resilient mounting force between said bearing cup and said yoke member when said radially outermost ends of said arcuate radial legs are engaged within said annular recess to hold said bearing cup in place.

2. An assembly according to claim 1, wherein said fixing plate is formed with four of said radial legs.

* * * * *